United States Patent [19]
Chiappetta

[11] Patent Number: 5,746,390
[45] Date of Patent: May 5, 1998

[54] AIR-LAND VEHICLE WITH DUCTED FAN VANES PROVIDING IMPROVED PERFORMANCE

[75] Inventor: Frank Richard Chiappetta, Berwyn, Pa.

[73] Assignee: Fran Rich Chi Associates, Inc., Berwyn, Pa.

[21] Appl. No.: 618,595

[22] Filed: Mar. 20, 1996

[51] Int. Cl.[6] .......................... B64C 27/08; B64C 29/02
[52] U.S. Cl. .................. 244/12.3; 244/12.2; 244/12.4; 244/12.5; 244/12.6; 244/17.23; 244/23 B; 244/23 C
[58] Field of Search .................. 244/2, 12.2, 12.3, 244/12.4, 12.5, 12.6, 17.21, 17.23, 23 B, 23 C, 23 D, 67, 188, 194, 130

[56] References Cited

U.S. PATENT DOCUMENTS

| | | | |
|---|---|---|---|
| 2,968,453 | 1/1961 | Bright | 244/12.5 |
| 3,276,528 | 10/1966 | Tucknott et al. | 180/7 |
| 3,405,890 | 10/1968 | Eickmann | 244/17.23 |
| 4,071,207 | 1/1978 | Piasecki et al. | 244/23 D |
| 4,173,321 | 11/1979 | Eichmann | 244/17.23 |
| 4,828,203 | 5/1989 | Clifton et al. | 244/23 B |
| 5,035,377 | 7/1991 | Buchelt | 244/23 C |
| 5,115,996 | 5/1992 | Moller | 244/23 D |
| 5,150,857 | 9/1992 | Moffitt et al. | 244/23 C |
| 5,454,531 | 10/1995 | Melkuti | 244/23 B |
| 5,505,407 | 4/1996 | Chiappetta | 244/2 |

FOREIGN PATENT DOCUMENTS

| | | | |
|---|---|---|---|
| 2922221 | 12/1980 | Germany | 244/23 B |
| 8907547 | 8/1989 | WIPO | 244/23 B |

*Primary Examiner*—Virna Lissi Mojica
*Attorney, Agent, or Firm*—William H. Meise

[57] ABSTRACT

A ducted fan 20 provides lift to a flying vehicle 10. The ducted fan includes direction control vanes (1, 2, 3, 4) for controlling torques applied to the vehicle, and also includes lift negation vanes (305, 306, 307, 308), which control the available lift. The lift negation vanes are oriented with their longitudinal axes parallel to the forward-aft axis (9) of the vehicle in order to reduce drag at high forward velocities. The thrust negation vanes include fixed (305) and movable (305M) portions, with the movable portions rotatable so as to extend into the duct airflow to cause turbulence. The direction control vanes are airfoils arranged for rotation about their quarter-chord axes (410), which reduces the amount of torque required for rotation of the direction-control vanes. This, in turn, allows stepper motors (924a) to be used to drive the vanes. The effects of forward velocity on the ducted fan also creates effects which tend to pitch the vehicle nose-down. A pair of conventional-type horizontally disposed airfoils (44a, 44b) is rotatable for pitch control, and a control system (700) senses airspeed, and provides a compensating rotation of the airfoils.

11 Claims, 9 Drawing Sheets

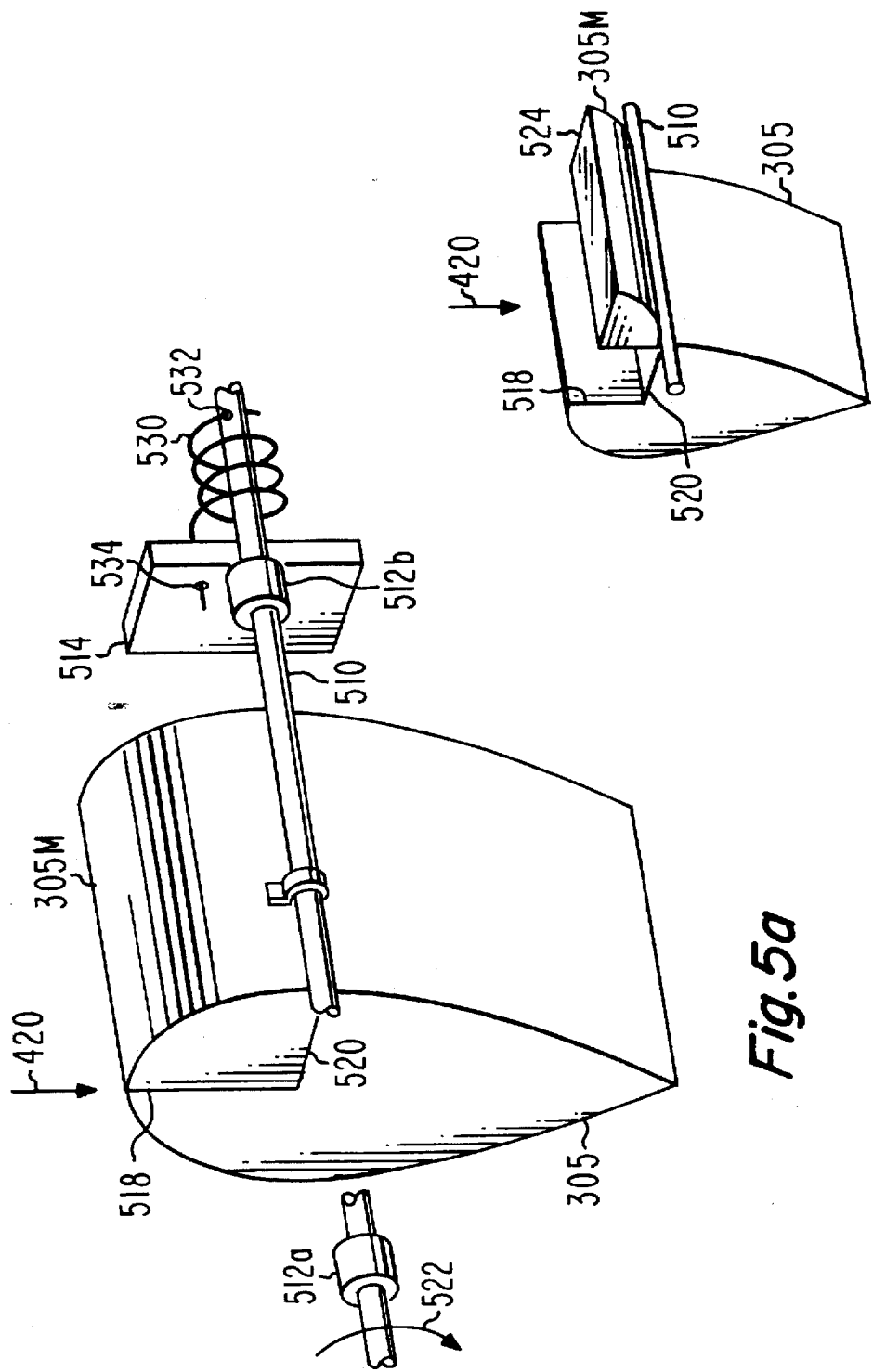

AIR-LAND VEHICLE WITH DUCTED FAN VANES PROVIDING IMPROVED PERFORMANCE

FIELD OF THE INVENTION

This invention relates to vehicles adapted for both terrestrial use and for flight, and more particularly to such vehicles which use ducted fans for lift in a flight mode, and vanes in the ducts for airflow control.

BACKGROUND OF THE INVENTION

Autogyro aircraft, in which a vehicle has helicopter-like airfoils rotated by the forward motion of the vehicle, have been known and used for many years, but have the disadvantage, much like an airplane, that flight must be preceded by a roll to achieve flight velocity. Helicopters are more often used, because takeoff may be accomplished from a fixed position. A great deal of attention has been directed toward a vehicle which is convertible for operation as both an automobile and a helicopter, as described, for example, in U.S. Pat. No. 4,173,321, issued Nov. 6, 1979 in the name of Eickmann. In order to function acceptably as an automobile on land without requiring special permits, the vehicle must have an overall width no greater than eight feet (8½ feet for a truck), corresponding to the greatest width for which highways are currently designed, as recognized in the above-mentioned Eickmann patent, although the exact maximum dimension varies from state to state, and may differ in foreign jurisdictions. An air-land vehicle using a plurality of ducted or shrouded fans to provide lift in a flight mode is described in allowed U.S. patent application Ser. No. 08/118,966, filed Sep. 9, 1993 now U.S. Pat. No. 5,505,407 in the name of Chiappetta. The vehicle therein described includes shrouded fans located about the center of mass or gravity (CG) so as to produce, in conjunction with air jet redirection flaps or vanes located within the ducts of the shrouded fans, the torques required to assume various attitudes. In one embodiment, an upper shrouded fan produces an air jet, centered above the CG, for lifting the body. A second shrouded fan, smaller than the first, produces an air jet for lift, centered below the center of mass, on the longitudinal axis of the vehicle, forward of the CG. Third and fourth paired shrouded fans produce air jets for lift, centered below the CG, on either side of the longitudinal axis of the vehicle, toward the rear of the body. The paired third and fourth fans have equal diameters, no greater than half of the diameter of the upper fan, to keep the total width within eight feet, which is the maximum transverse dimension for highway use. The engine is coupled to the fans during flight, for driving them at speeds which are in a mutually fixed ratio, with the rotation direction of the upper fan contrary to the directions of rotation of the other three, whereby rotational moments are substantially canceled. Movable vane arrangements are coupled in the ducts of the shrouded fans, for redirecting the air jets, for providing directional forward, aft, left, and right translation, and rotation or yaw motions, and pitch and roll attitudes. Thrust negation vanes are provided in the ducts, for selecting (reducing to a value below the maximum) lift at any particular engine speed, without requiring a change of engine speed. It has been found that the forces required to operate the vanes is sufficiently large so that substantial effort may be required of the operator in the case of direct mechanical operation, and that the flight attitude is affected by the forward velocity of the vehicle. An improved air-land vehicle is desired.

SUMMARY OF THE INVENTION

An air-land vehicle adapted for terrestrial vehicular use and for flight includes a body defining a forward/aft axis. The body supports at least one ducted or shrouded fan which provides lift when the fan is powered. The shrouded fan includes a circular shroud defining a duct, and a fan centered for rotation in the duct. The shrouded fan further includes direction control vanes for redirecting airflow through the duct in a manner which provides a net thrust in at least forward/aft or left/right directions. In a preferred embodiment of the invention, the vanes of the shrouded fans are also capable of redirecting airflow to provide clockwise or counterclockwise moments. The shrouded fan further includes lift or thrust negation vanes located within the duct, which reduce the lift provided by the shrouded fan, nominally without net thrust in the forward, aft, left, or right directions, and without net moments. According to an aspect of the invention, each of the thrust negation vanes is elongated along an axis of elongation, and extends across the duct with the axis of elongation parallel with the forward/aft axis of the body. According to another aspect of the invention, at least one of the direction control vanes comprises an elongated airfoil arranged for rotation about its quarter-chord axis, which tends to minimize the force or moments required to rotate the vane in the duct airstream. This, in turn, allows a relatively low-torque electric motor, such as a stepping motor with a gear reduction, to be used for control of the direction control vanes. According to another aspect of the invention, the lift negation vane(s) comprises first and second portions which together, in a closed state, define an elongated airfoil which provides relatively small resistance to the flow of air through the duct, and which, in an open state, splits along a plane of symmetry, so as to have a portion of the airfoil extending nominally perpendicular to the flow of air through the duct, for creating turbulence which reduces lift. In a preferred embodiment, the lift negation vanes are arranged in pairs within each duct, with the movable portions which provide the lift reduction facing away from each other, and toward the walls of the duct. In a preferred embodiment, the force required to actuate the lift negation vanes is reduced by using a torsion spring arrangement, which tends to compensate for the forces acting on the vane by the airstream, so that the externally applied actuation force tends to remain constant. According to a further embodiment of the invention, rear airfoils not unlike conventional fixed-wing aircraft horizontal stabilizers are provided, and are controlled in conjunction with the forward velocity of the vehicle in a manner which compensates for pitch-down of the vehicle, which pitch-down is attributable to the effects on the lift of the ducted fans of the forward-motion component of the airflow through the ducted fan. According to a further aspect of the invention, the rear airfoils are operated differentially, like ailerons, in response to forward velocity of the vehicle, in order to compensate for roll or roll moments occasioned by imbalances in the structure which depend upon the airspeed. One such source of roll is any net imbalance in lift between the shrouded fans due to the blades which are relatively advancing and retreating in the airstream.

BRIEF DESCRIPTION OF THE DRAWINGS

FIG. 5a is a simplified cross-sectional isometric or perspective view of a thrust negation vane according to an aspect of the invention, in its closed position, and FIG. 5b illustrates the movable portion open;

DESCRIPTION OF THE INVENTION

Figure 1:
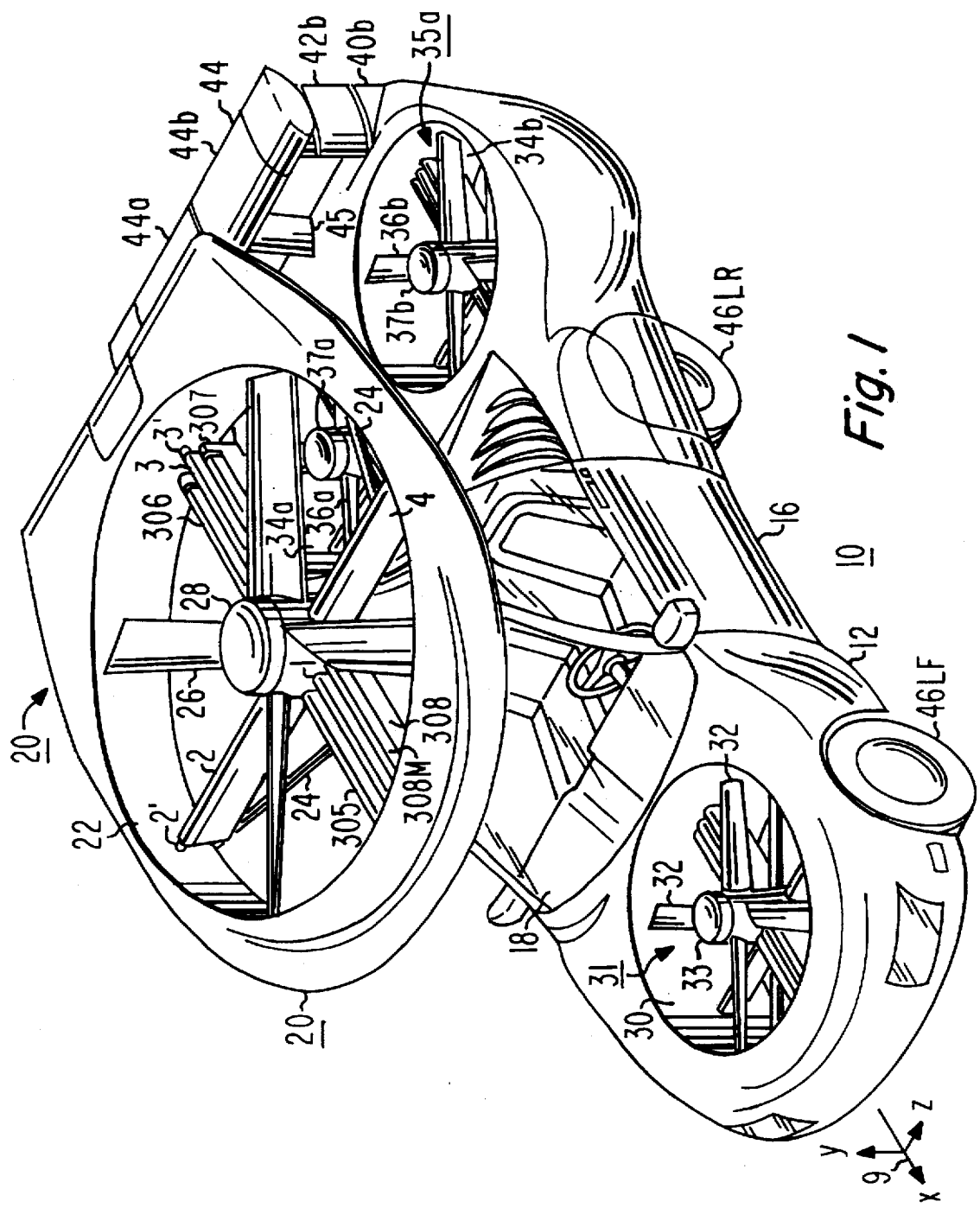
FIG. 1 is a simplified perspective or isometric view of an air-land vehicle according to the invention, illustrating ducted or shrouded fans with direction control vanes and lift negation vanes.

In FIG. 1, an air-land vehicle 10 according to the invention includes a body 12, which has a generally aerodynamic shape for travel in the direction of a longitudinal x axis 9. Body 12 is generally symmetrical about a body-bisecting vertical x-y plane. A door 16 provides access to the interior of the vehicle. A windshield 18 allows vision in the preferred direction of motion (x) indicated by an arrow 9. A shroud 22 of a first or upper shrouded or ducted fan 20 is supported above body 12 by struts designated 24. A four-bladed fan 26 lies within the duct or window defined by shroud 22, and is affixed to a hub 28. Hub 28 is ultimately driven by an engine arrangement as described in the abovementioned Chiappetta patent application. In order for vehicle 10 to fit onto a conventional highway in a land travel mode of operation, the overall diameter of fan 26 is about 6.6 feet, and the lateral dimension (parallel to the z axis) of shroud 22 is 94 inches, which is less than the eight-foot maximum highway dimension which is permissible for cars without special permits. Fan 26 rotates clockwise (as seen from above). The longitudinal dimension (parallel to the x axis) of shroud 22 is larger than the lateral dimension solely for aerodynamics.

As described in detail in the abovementioned Chiappetta patent, the center of mass or center of gravity (CG) of body 12 of vehicle 10 of FIG. 1 lies approximately beneath hub 28 of shrouded fan 20, and approximately in the x-y plane, depending upon the mass and location of the payload. Body 12 defines a duct 30 forward of the center of gravity, which, together with a four-bladed fan 32, forms a second or forward ducted fan 31. A rearward pair of further ducts 34a, 34b is defined by body 12 at locations symmetrically disposed on either side of the x-y plane, and aft of the center of gravity. Ducts 34a and 34b accommodate fans 36a and 36b, respectively, of ducted fans 35a and 35b. The fans of ducted or shrouded fans 31, 35a and 35b are identical, and each have four blades with diameters which may be about 38 inches. Fans 32, 34a and 34b rotate counterclockwise, with a net rotational momentum selected to cancel the clockwise rotational momentum of upper shrouded fan 20, all as described in the abovementioned Chiappetta patent application.

Unlike the arrangement of the abovementioned Chiappetta patent application, the vehicle according to the invention includes two vertically-projecting stabilizers 40a and 40b, but only 40b is visible in FIG. 1. The stabilizers 40a and 40b are supported by body 12 near the rear of vehicle 10. In a preferred embodiment of the invention, the stabilizers 40a and 40b include totally movable rudders 42a, 42b, which are rotatable around a shaft located at the quarter-chord point or axis of the airfoil, to minimize the forces required to rotate the rudder elements. An elevator trim and aileron trim structure 44 extends between the upper ends of the vertical stabilizers and provides support, as well as providing for pitch and roll control, as described in more detail below. The movable right portion 44a and left portion 44b of structure 44 provide elevator-like pitch control when operated synchronously or in the same direction, and provide aileron-like roll control when operated differentially. Structure 44 is supported, in part, by a stabilizer 45. A steerable left front wheel 46LF and a left rear drive wheel 46LR which are visible in FIG. 1 are of conventional automotive type, adapted for highway and possibly some off-highway use, and are matched by corresponding wheels on the other side of the vehicle. The corresponding right steering front and rear drive wheels are designated 46RF and 46RR, respectively.

As in the abovementioned Chiappetta patent application, the fan blades 26, 32, 36a, and 36b of FIG. 1 are rigidly affixed to their hubs 28, 33, 37a, 37b, respectively, so that no complex mechanisms are necessary for varying the pitch angle of the blades to vary the thrust. Instead, the maximum available thrust is controlled by adjustment or control of the engine speed, which in turn is directly related to the fan speeds, because the fan drives are fixedly coupled in a particular rotational ratio to the engines and to each other.

Figure 2A:
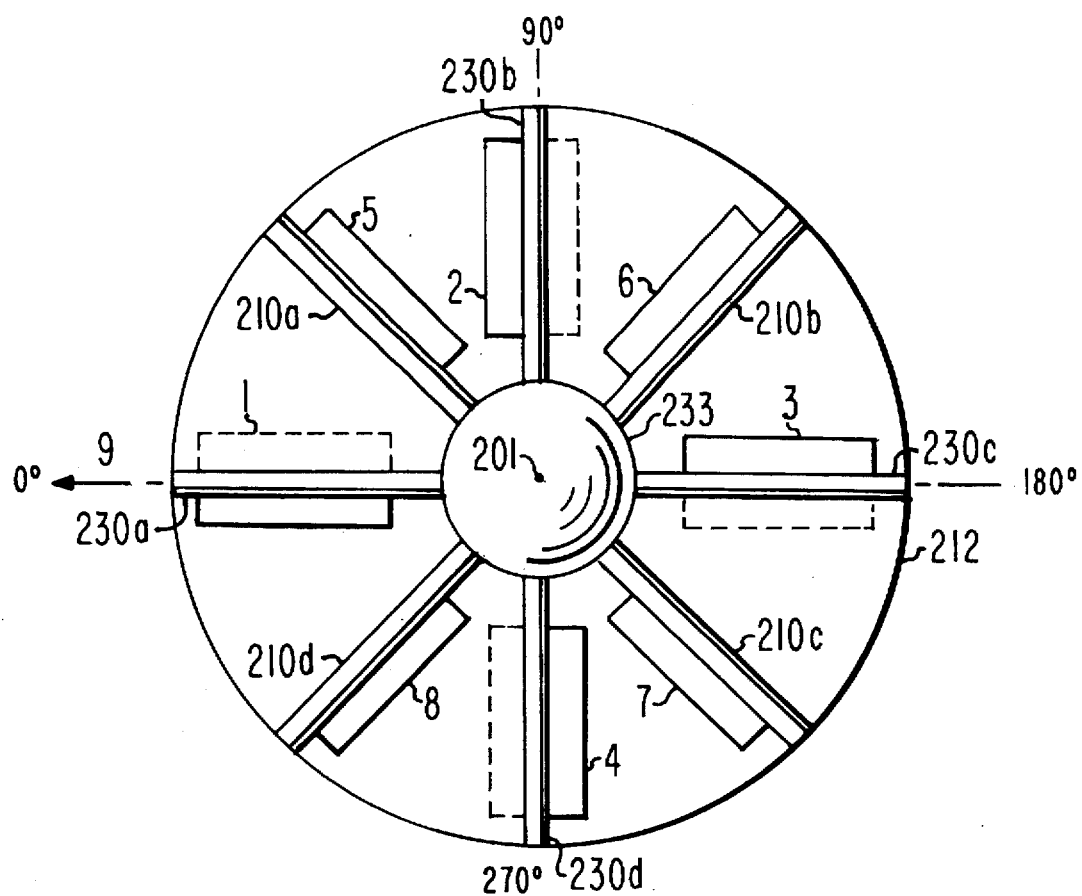
FIG. 2a is a plan or top view of a representative shrouded fan of a prior art vehicle.
Figure 2B:
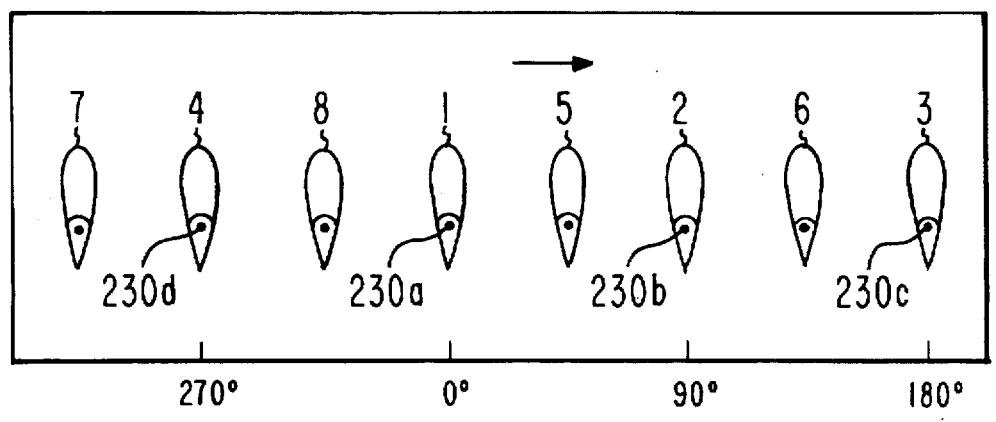
FIG. 2b is a developed view of the arrangement of FIG. 2a as seen from the outside.

However, rapid maneuvering of the vehicle may require rapid changes in net thrust, which, if derived solely from engine speed variations, might result in delays as a result of inertia, which tends to resist speed variations in response to control of the throttle or speed setting. Instead, net thrust may be quickly controlled by a set of vanes associated with each fan, including large upper shrouded fan 20. FIG. 2a is a plan view of the control vanes of a typical fan duct as described in the abovementioned Chiappetta patent application, without the fan. The arrangement of FIG. 2a illustrates an inner edge 212 of a duct, and the direction of forward motion is indicated by axis 9. A first end of the range of motion of thrust redirection or control vanes 1, 2, 3, and 4 is indicated by solid lines, and the other end of the range of motion of thrust redirection vanes 1, 2, 3, and 4 is indicated by dash lines. The thrust redirection vanes 1, 2, 3, and 4, are each in the form of a movable flap at the trailing edge of a fixed airfoil, rotatable about shafts 230a, 230b, 230c, and 230d, respectively. The thrust redirection vanes, when in the position illustrated by solid lines in FIG. 2a, tend to direct the downward airflow in a counterclockwise direction, which tends to impart a clockwise torque to the vehicle. The arrangement of FIG. 2a also includes thrust negation vanes 5, 6, 7, and 8 extending "diametrically across" the fan, and rotatable about shafts 210a, 210b, 210c, and 210d, respectively. Clearly, any one thrust negation vane, such as vane 5, does not extend fully across the entire duct, nor even across a full half diameter of the duct, because of the presence of the hub 233. However, the axes of rotation of the movable portions of the thrust negation vanes are diametric, and, taken in pairs, they effectively extend across the entire duct, so they may be said to extend "diametrically across." The thrust negation vanes are operated in oppositely directed pairs so as to, in effect, cause mutually opposite rotational forces on the vehicle. Thus, vanes 5 and 6 of FIG. 2a, in their illustrated positions, result in mutually opposed rotational forces on the vehicle, and vanes 7 and 8, taken as a pair, also result in mutually opposed torques on the vehicle. The mutually opposite rotational forces cancel, and the resulting turbulence reduces the lift. It has been found that when the vehicle using a fan as described in conjunction with FIG. 2a is moving at substantial speed in a forward direction, the airflow through the fan and across the thrust negation vanes is such as to cause substantial drag, even with the thrust negation vanes set for maximum lift (minimum negation). This may be understood by considering that, when the ducted fan illustrated in FIG. 2a is moving in the direction of vehicle longitudinal axis 9, the airflow direction is not simply downward (into the plane of FIG. 2a), but also has a significant rearwardly-directed component (to the right in FIG. 2a). The rearward component of the airflow, in turn, at least in part impinges laterally on, or contacts, flaps 5, 6, 7, and 8, and their fixed airfoils, regardless of the flap positioning. FIG. 2b is a developed cross-sectional view of the arrangement of FIG. 2a, illustrating the cross-sectional shape of control vanes 1, 2, 3, and 4 with their fixed airfoils and movable trailing flap portions, and also illustrating lift negation vanes 5, 6, 7, and 8 and their movable portions. Only the cross-sectional shape of each control or lift negation vane is visible in the developed view of FIG. 2b, because the longitudinal axes of the vanes are radially disposed relative to hub center 201 of FIG. 2a.

Figure 3A:
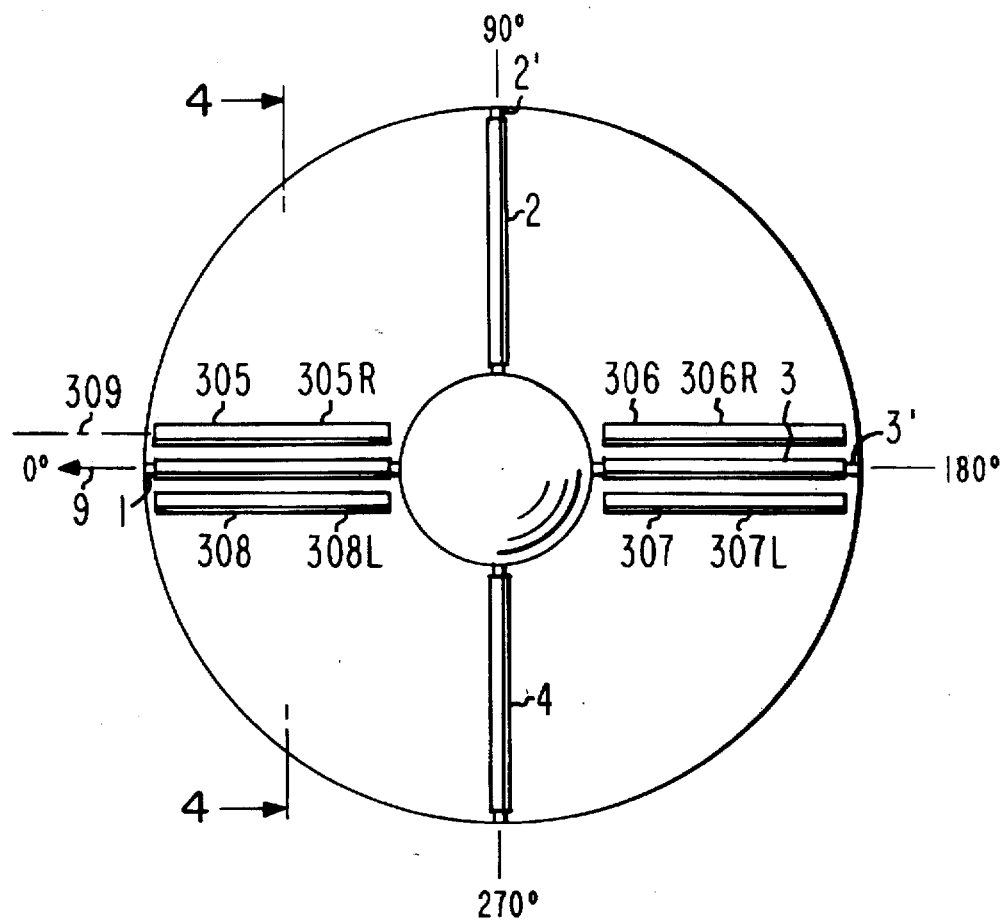
FIG. 3a is an plan or top view of a representative shrouded fan of the vehicle of FIG. 1.

According to an aspect of the invention, all of the thrust negation vanes have their longitudinal axes or the axes of rotation of their movable portions parallel to the longitudinal axis 9 of the vehicle, so that the rearwardly-directed component of airflow which occurs during forward flight does not have a significant component which impinges laterally on the thrust negation vanes. This, in turn, reduces overall drag, and provides all the concomitant advantages of reduced drag. In FIG. 1, upper shrouded fan 20 has four movable control vanes 1, 2, 3, and 4, which are individually rotatable about their axes. These vanes are in the shape of radially oriented airfoils lying within the airstream of the duct, for redirecting the airstream in order to provide torques for changing the attitude of the vehicle. Also in FIG. 1, thrust negation vanes 305, 306, 307, and 308 are oriented with their longitudinal axes parallel to longitudinal axis 9 of the vehicle 10, rather than radially within the duct. FIG. 3a is a top view of upper shrouded fan 20 of FIG. 1. Control vane 1 of FIG. 1 has its longitudinal axis lying radially and parallel to fore-aft axis 9, which is designated as 0° in FIG. 3a, control vane 2 of FIG. 1 has its longitudinal axis at right angles to longitudinal axis 9, which position is designated 90° in FIG. 3a. Similarly, control vane 3 of FIG. 1 has its longitudinal axis on an extension of the longitudinal axis of vane 1, and is designated 180° in FIG. 3a, and control vane 4 of FIG. 1 has its longitudinal axis on an extension of the longitudinal axis of vane 2, which is designated 270° in FIG. 3a. Unlike the arrangement arrangement of the abovementioned Chiappetta patent application, the entire control vane is rotatable around its axis of rotation, for purposes described below. The shaft or bearing which supports the outboard end of control vane 2 is visible as 2' in FIG. 1, and the shaft or bearing which supports the outboard end of control vane 3 is visible and designated as 3'.

Figure 3B:
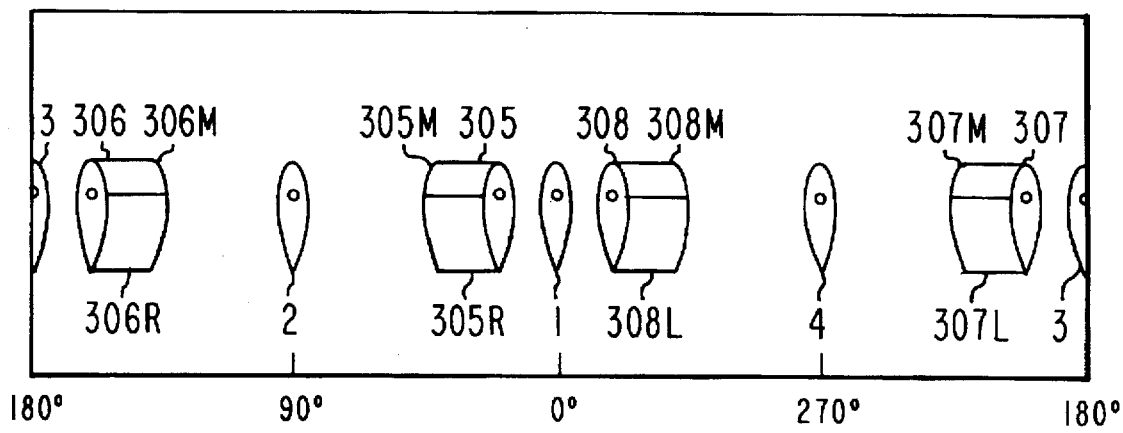
FIG. 3b is a developed view of the arrangement of FIG. 3a, illustrating the nonradial positioning of the lift negation vanes

FIG. 3b is a developed view of the arrangement of FIG. 3a. In FIG. 3b, the edge-on cross-section of each of the control vanes 1, 2, 3, and 4 can be see at the 0°, 90°, 180°, and 270° positions. Also visible is the cross-section of each of the lift negation vanes 305, 306, 307, and 308. Since lift negation vanes 305, 306, 306, and 307 are not radially disposed, however, one side of each of the lift negation vanes can also be seen in the view of FIG. 3b. More particularly, the right side 305R of lift negation vane 305 is visible in FIG. 3b, and the left side 308L of lift negation vane 308, the left side 307L of lift negation vane 307, and the right side 306R of lift negation vane 306 are also visible in FIG. 3b. With this arrangement of the lift negation vanes, the rearwardly directed component of air flow through the duct of the fan during forward motion of the vehicle is always parallel to the length or axis of elongation of each lift negation vane 306, 307, and the drag introduced thereby is minimized.

Figure 3C:
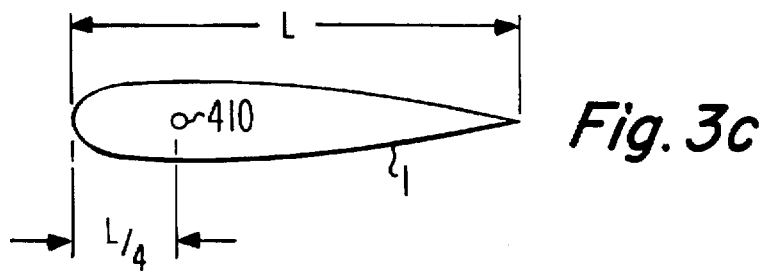
FIG. 3c is a symmetrical airfoil.

According to a further aspect of the invention, each control vane 1, 2, 3, and 4 has the cross-section of an airfoil, preferably a symmetric airfoil, and is rotated about its quarter-chord axis. In FIG. 3c, symmetrical airfoil 1 has a total length L, and the quarter-chord axis of rotation is illustrated as being located at L/4 from the leading edge; rotation of the airfoil about the quarter-chord axis 410, in principle, requires zero torque, and in practice requires a very small torque, so long as the angle of attack of the airfoil is less than about 20°.

Figure 4:
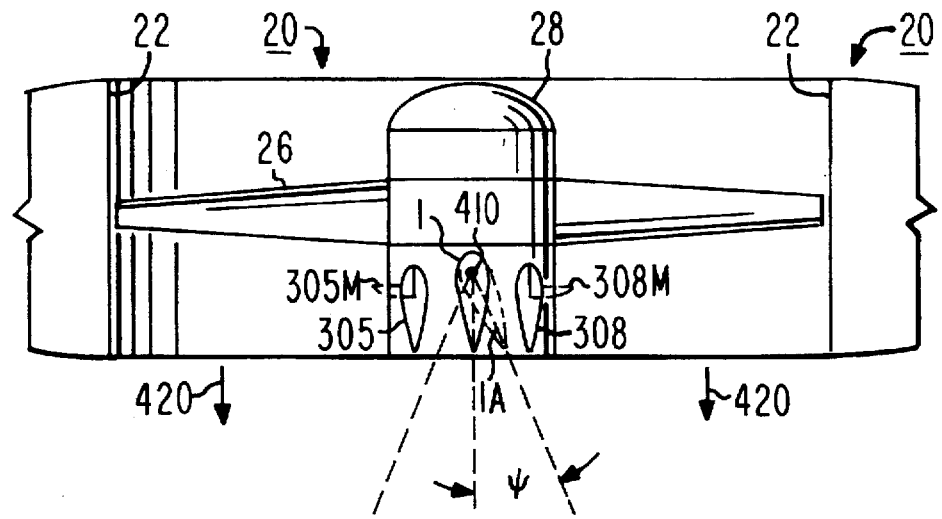
FIG. 4 is a transverse cross-section of a shrouded fan of the arrangement of FIG. 1, illustrating the relationship between a representative control vane and the adjacent lift negation vanes.

FIG. 4 is a cross-sectional view of the arrangement of FIG. 3a looking along section line 4—4, and is typical of all the ducted fans of the vehicle. In FIG. 4, upper shrouded fan 20 includes the duct defined by duct or shroud sides 22, and four-bladed fan 26 rotates about hub 28. Control vane 1 has a cross-section in the form of a symmetrical airfoil, assumes a neutral position illustrated by solid lines, and can be rotated in a first direction about an axis 410 through an angle $\psi$ to the position illustrated in dash lines as 1A. Vane 1 can be similarly rotated by the angle $\psi$ in the other direction. It has been discovered that the maximum angle $\psi$ can assume before the airfoil stalls is about 20°. At angles above stall, the airfoil does not provide sufficient redirection of the airflow, and cannot provide proper attitude-correction torques to the vehicle. While only one of the control vanes is illustrated in FIG. 4, the same principle applies to all four control vanes of shrouded fan 20, and to the control vanes of shrouded fans 31, 35a, and 35b. Control vane rotational axis 410, as mentioned, lies on the quarter-chord axis of the symmetrical airfoil of the vane. This axis has the characteristic that no rotational moments are generated thereabout, so that nominally zero torque is required to rotate the airfoil within its airstream up to stall. This convenient location, then, makes it possible to control the rotational position of each control vane by a controller which generates little torque. For example, the embodiment now preferred contemplates the use of electronically controlled stepping motors, appropriately geared to the shaft of the airfoil being controlled, to adjust the vane position in response to attitude control commands. As contemplated, the commands are in the form of electrical pulses which the stepping motor converts into step-incremented rotation, which is geared to the vane to provide slight rotation in response to each pulse. Rapid control is possible with such an arrangement, because pulses can be applied to the motor in bursts, causing many steps to occur in a short period of time.

According to another aspect of the invention, each lift negation vane includes a movable portion which is located adjacent it leading edge, rather than its lagging edge. As illustrated in FIG. 4, lift negation vanes 305 and 308 lie adjacent to control vane 1. Lift negation vane 305 includes a movable portion 305M, which lies adjacent to its leading edge, on the left side as seen in FIG. 4, and which assumes the alternate position illustrated by dash lines by rotation through 90° in a counterclockwise direction in FIG. 4. The illustrated alternative position of portion 305M of the movable portion of lift negation vane 305 projects transversely into the airflow through the duct, creates turbulence, and thereby reduces lift. Naturally, the rotation can be by any amount between 0° and 90°, and the transverse projection of the movable portion 305M into the downwardly directed airflow 420 through the duct will depend upon the angle of rotation, and the lift negation will be related to the amount of the transverse projection. Lift negation vane 308 similarly includes a portion 308M, which lies adjacent to its leading edge, on the right side as seen in FIG. 4, and which assumes the alternate position illustrated by dash lines. The illustrated alternative position of portion 308M of lift negation vane 308 projects transversely into the airflow 420 through the duct by an amount related to the rotation of the movable portion, and thereby creates turbulence, and reduces lift. In each case, the projecting, turbulence-producing movable portion of the lift negation vanes projects away from the immediately adjacent control vane. Thus, movable portion 305M in FIG. 4 projects to the left side of vane 305, which is the side away from control vane 1, while movable portion 308M projects to the left side of vane 308, which is the side away from control vane 1. With this orientation of the vane, the turbulence which is occasioned by extension of the thrust negation portion of the thrust negation vane does not cause turbulence adjacent to the control vane, so that the control vane may continue to provide thrust redirection control during periods in which lift negation is provided. Put in another way, control vane 1 of FIG. 4 "sees" only a fixed, smooth airfoil on its left and right sides, and its own smooth airflow is not interfered with by extension of the projecting portions 305M and 308M of the thrust negation vanes 305 and 308, respectively.

FIG. 5a is a simplified cross-sectional isometric or perspective view of a representative thrust negation vane according to an aspect of the invention, in its closed position, and FIG. 5b illustrates the movable portion open. In FIG. 5a, movable portion 305M of vane 305 is affixed to an axle 510, which is held to the vehicle structure by a first bearing 512a and by a second bearing 512b. A portion of the vehicle structure is illustrated as a bulkhead 514. As illustrated in FIG. 5a, movable portion 305M has a first surface 516 which blends smoothly with the remaining surface of vane 305 to define a symmetrical airfoil, and also has surfaces (not visible in FIG. 5a) which are associated with parting lines 518 and 520. Movable portion 305M is movable together with rotation of shaft 510, when thrust negation vane control torque is applied to shaft 510 in the direction of arrow 522. FIG. 5b illustrates the structure of FIG. 5a with movable portion 305M opened, as a result of rotation of shaft 510 in the direction of arrow 522 in FIG. 5a. As illustrated in FIG. 5b, movable portion 305M of vane 305 presents a broad surface 524 broadside to the airstream 420. This broad surface causes turbulence, which reduces lift in the associated ducted fan. The amount of turbulence will depend upon the angle between 0° and 90° to which the shaft and the associated movable portion is turned. It will be understood that, when movable portion 305M of vane 305 of FIG. 5b is partially open, significant forces will act on broad surface 524, which will cause a torque tending to further open the movable portion. In order to reduce the magnitude of the forces which must be applied to shaft 510 during opening and closing operations, a torque spring in the form of a coil spring 530 is associated with shaft 510. Torque spring 530 is wound about shaft 510, and is affixed to shaft 510 at one end by passing the spring end through an aperture 532 in the shaft. The other end of spring 530 is affixed to bulkhead 514 by passing the spring end through an aperture 534. When so arranged, the spring will create a torque which tends to countervail the torque generated by the airflow against the opened movable portion 305M of the vane. With such an arrangement, the torque required to move the movable portion of the vane from one position to another tends to remain constant, regardless of the position of the movable portion.

Figure 7:
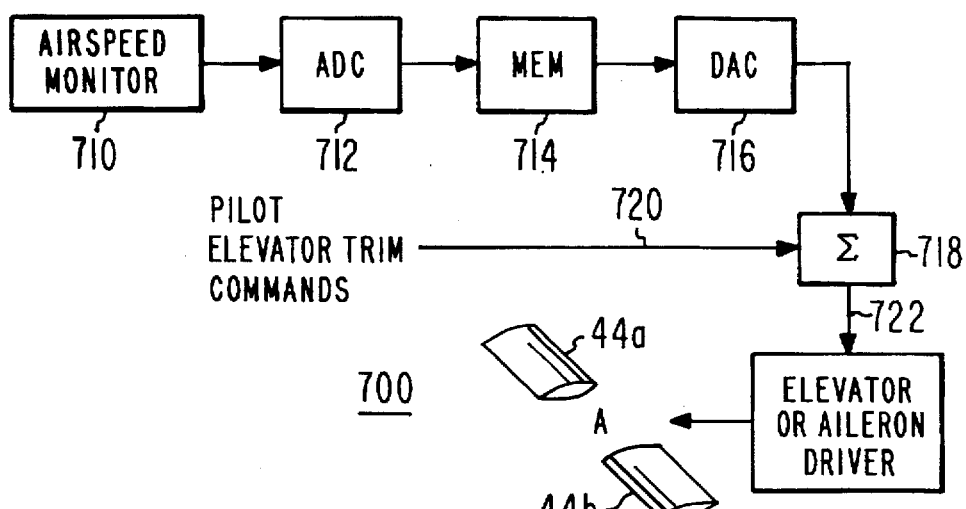
FIG. 7 is a simplified block diagram of a control system according to an aspect of the invention, which senses airspeed and corrects the pitch attitude in response thereto.
Figure 6:
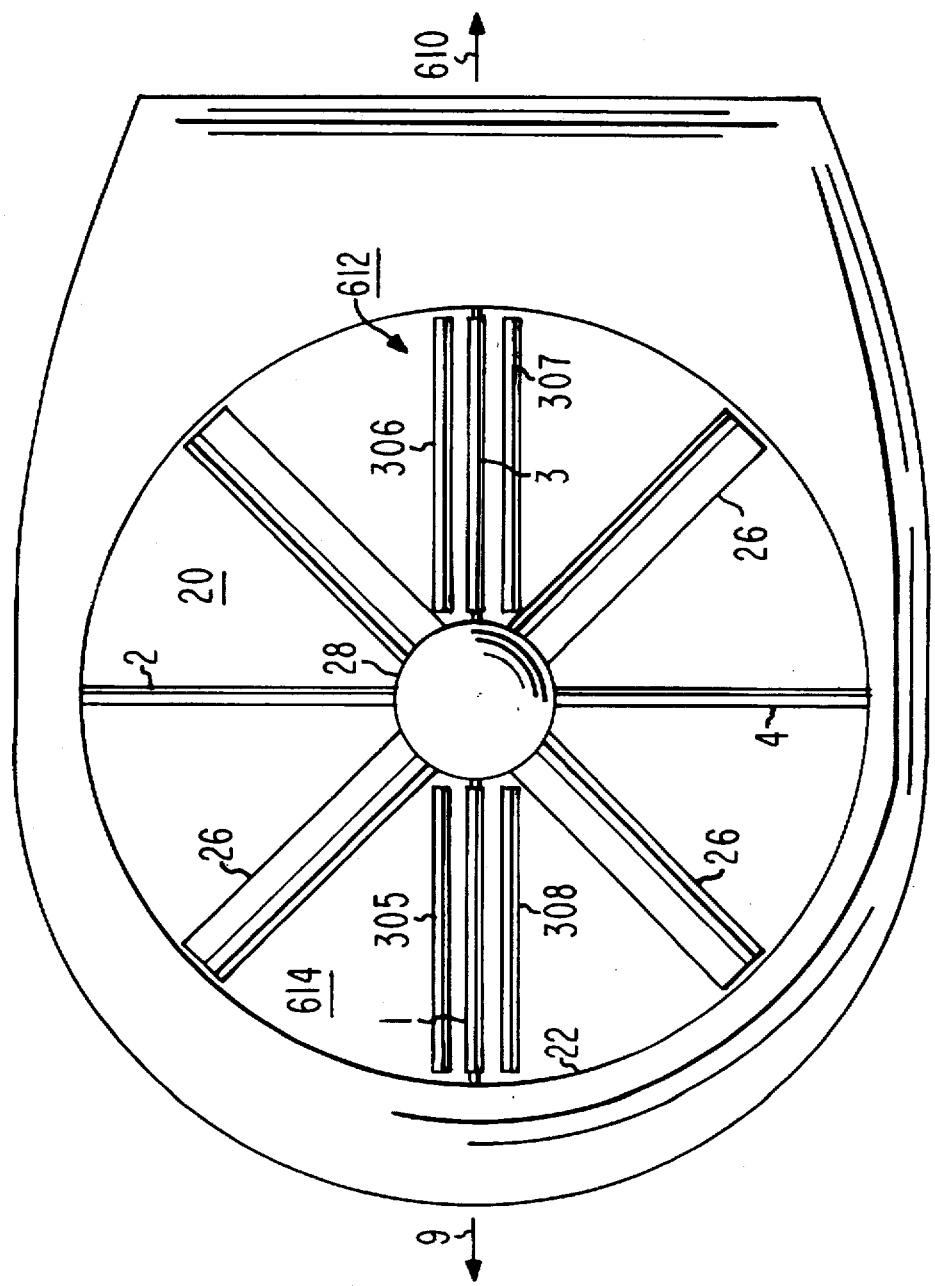
FIG. 6 is a top or plan view of upper shrouded fan 20, illustrating the direction of airflow which compresses the air against the rear of the duct which tends to cause a pitch-down attitude.

It is believed that, in a vehicle such as that described in FIG. 1, forward motion may be achieved simply by use of the control vanes, without significantly pitching the vehicle bow-down. When the vehicle is moving forward in a normal horizontal attitude, the airflow through each of the ducts includes a rearwardly-directed component, as mentioned above. It has been discovered that this rearwardly-directed component of airflow results in a slight air density difference across the duct, which affects the lift which the fan blades provide. FIG. 6 is a top or plan view of upper shrouded fan 20, taken as being typical of all the shrouded fans of the vehicle. In FIG. 6, hub 28 holds the four rotating fan blades 26. The vehicle is assumed to be moving to the left in the direction of arrow 9, with the result that the relative airflow is in the direction of arrow 610. The air density at the back 612 of the duct is, as a result, greater than the air density at the front 614 of the duct, because the rearwardly-directed component of the airflow through the duct tends to "compress" the air against the rear inner surface of the duct, with a concomitant rarefaction near the front inner surface of the duct. The different air densities, in turn, result in greater lift for those fan blades which are transiting the rear of the duct relative to those fan blades transiting the front of the duct. The difference in lift between the instantaneous "front" and "rear" fan blades results in a torque on the shrouded fan, and therefore on the vehicle itself, which tends to pitch the vehicle nose-down. This nose-down pitch tendency is dependent on the forward airspeed. According to an aspect of the invention, the forward component of airspeed is measured or estimated, and used to adjust control surfaces in a manner which tends to counteract the nose-down pitch tendency. While this effect occurs, in principle, for any direction of vehicle motion, it is believed that motion at speeds likely to induce the nose-down pitch will be sought only in the forward direction, since relatively high speeds to the rear or in lateral directions may be dangerous for lack of maximum visibility. Many types of sophisticated attitude controllers are known for use in airborne vehicles, so detailed explanation of the attitude control system is not necessary. FIG. 7 is a simplified block diagram of an open-loop elevator and/or aileron trim controller for use in the vehicle of FIG. 1. In the arrangement of FIG. 7, an airspeed monitor 710 produces an analog signal representative of the forward airspeed, which is applied to an analog-to-digital converter (ADC) 712. The resulting digital signals representative of airspeed are applied as addresses to a ROM memory 714, which is preprogrammed with signals representing the amount of elevator trim which is required at each airspeed. ROM 714 produces digital signals representative of the trim desired to maintain neutral attitude at the measured airspeed. These trim signals are applied, if desired, to a digital-to-analog converter (DAC) 716 for conversion back to analog form, and the analog signals are applied to a summing circuit 718 for summing with elevator and/or aileron control signals originating from the pilot or from an autonomous attitude control system, applied over a signal path 720. The sum of the trim signals and the control signals are applied from summer 718 to a path 722 for application to an elevator position drive. Naturally, DAC 716 may be deleted if summer 718 and the control signals on paths 720 and 722 are digital.

When the vehicle is operating in its airborne mode, and travelling in a forward direction, the rotation of the fan blades may result in a roll torque as a result of the effective velocity of the blade through the air on the advancing and retreating fan blades. It is expected that, since the large upper ducted fan 20 rotates in a direction opposite to that of the three smaller ducted fans 31, 35a, 35b, that the roll torques attributable to the fan blade relative airspeed will be in opposite directions, and will tend to cancel. There may, however, be some residual roll torque which does not cancel, and the memory 714 of the control system of FIG. 7 may include information relating not only to the elevator (synchronous) control of the structure 44 (including elements 44a and 44b) of FIG. 1, but also to the aileron-type (differential) control associated with each airspeed increment.

Figure 8:
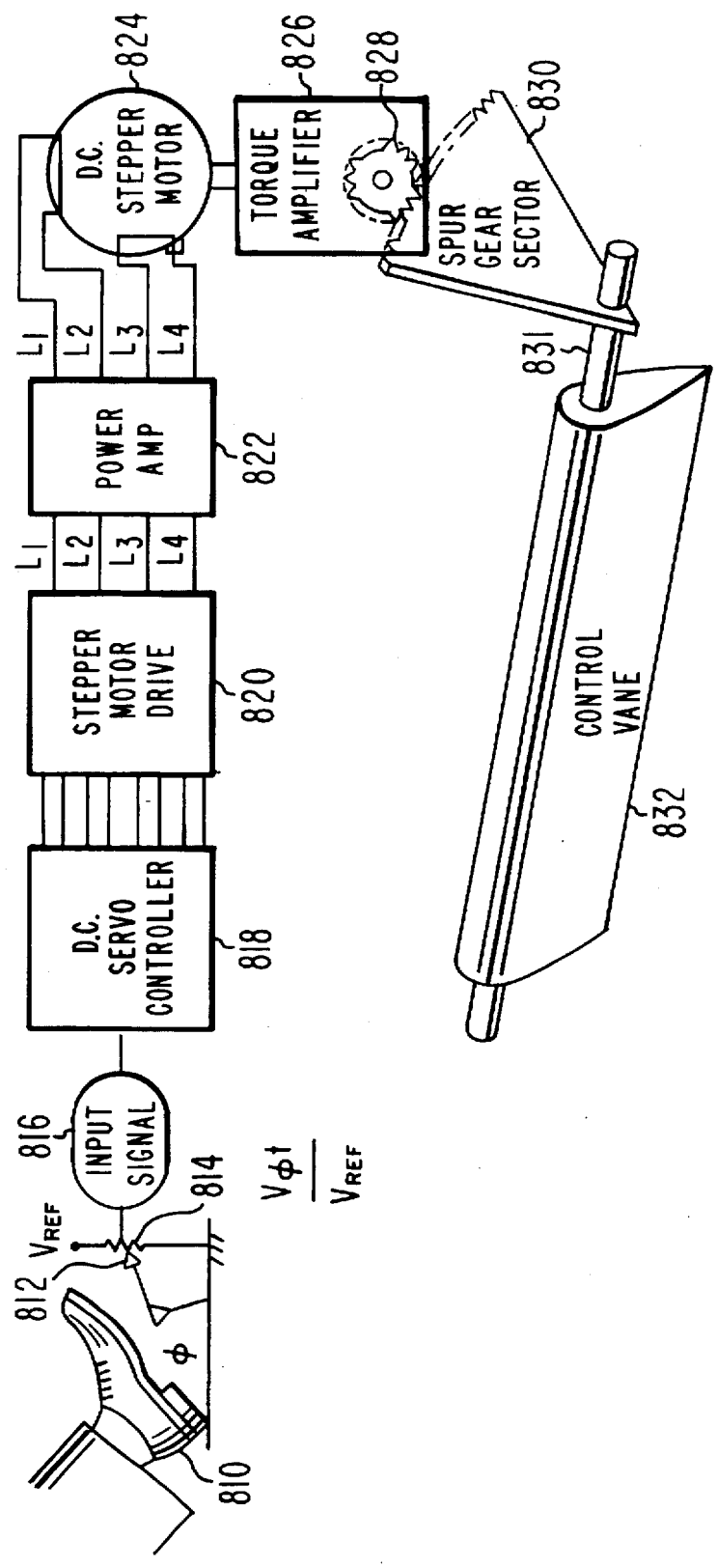
FIG. 8 is a simplified block diagram of a control system for driving direction control vanes.

FIG. 8 is a simplified block diagram of a control system for driving direction control vanes in accordance with an aspect of the invention. In FIG. 8, an operator 810 operates a movable control 812 in a manner which is ultimately intended to control the position of a vane 832. The movable control 812 interacts with another portion 814 of the control, illustrated as a resistive potentiometer. A control-position-related signal is generated by the potentiometer and its movable portion, and applied as input signal generator 816 to a servo controller 818, which compares the control signal with a reference signal. The resulting error signal is applied from DC servo controller 818 to a stepper motor driver 820, which generates step signals, which are amplified in a power amplifier 822 and applied to a stepper motor 824. The stepper motor steps through a specified angle in repsonse to each amplified step signal. The motion is coupled through a torque amplifying gear reduction box 826, and the reduced-amplitude motion is coupled by a pinion gear 828 to a sector spur gear 830, which turns the axle 831 of vane 832. As mentioned, the axle or axis about which control vane 832 rotates coincides with the quarter-chord axis, so that the forces required to rotate the vane are well within the capabilities of a stepping motor. Those skilled in the art know that the reference signal to which the input signal is compared in error signal generating controller 818 may be dependent upon the position of control vane 832, so that the controller of FIG. 8 may be a feedback control system. The same general type of control system may be used to control the lift negation vanes, because they have torque springs to tend to cancel torque variations.

Figure 9A:
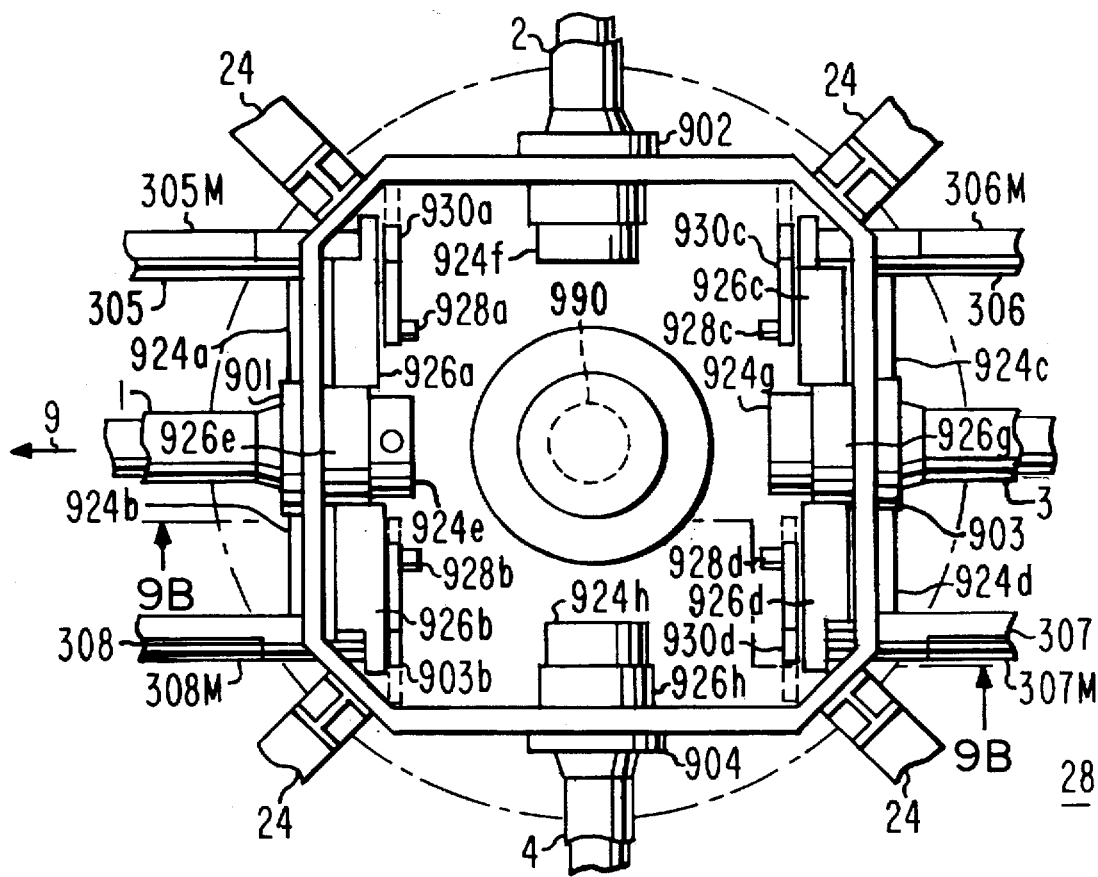
FIG. 9a is a view of the mechanism associated with the hub.
Figure 9B:
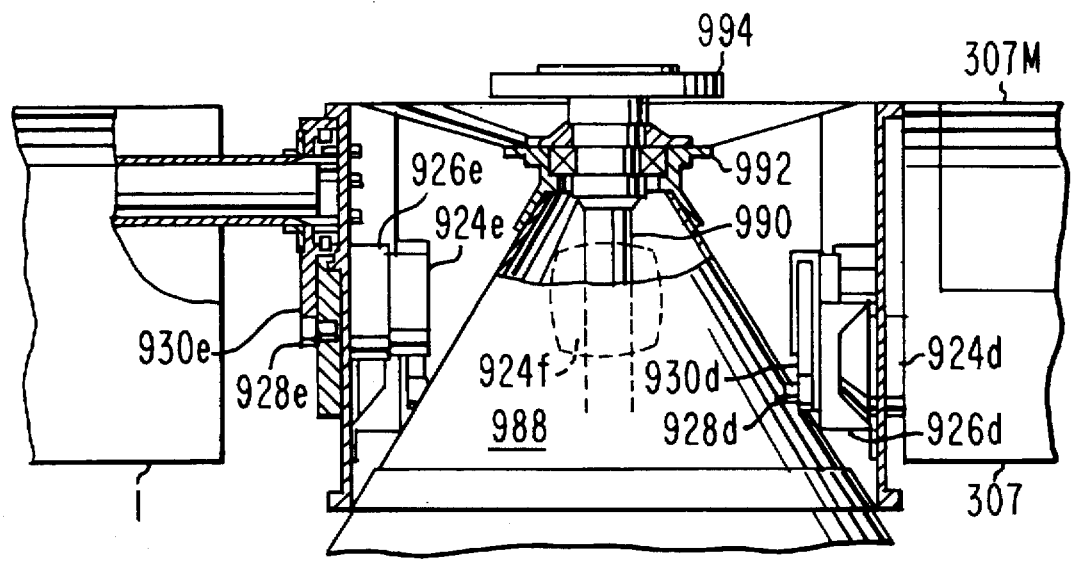
FIG. 9b illustrates the relationship in the vertical plane of the motor to the gearbox.

FIG. 9a is a view of the mechanism associated with hub 28 of FIG. 1. In FIG. 9a, the inner ends of vanes 1, 2, 3, and 4, are anchored by bearings 901, 902, 903, and 904, respectively, to the hub. The support struts 24 are attached at 45° points to provide the hub with support. The large upper fan (not illustrated in FIG. 9a) is driven by a shaft, seen end-on as 990. The thrust negation vanes are controlled by stepping motors, gear boxes and sector gears. In FIG. 9a, a first stepper motor 924a controlled as described above in conjunction with FIG. 8 drives a gear reduction box 926a, which in turn drives a pinion gear 928a. Pinion gear 928a, in turn, drives a sector spur gear 930a affixed to movable portion 305M of thrust negation vane 305. Movable portion 305M, and the other movable portions of thrust negation vanes in FIG. 9a, are illustrated in their closed or non-negating condition. Similarly, a second stepper motor 924b, controlled in the same manner as stepper motor 924a, drives a gear reduction box 926b, which in turn drives a pinion gear 928b. Pinion gear 928b, in turn, drives a sector spur gear 930b affixed to movable portion 308M of thrust negation vane 308. Third and fourth controlled stepper motors 924c and 924d drive a gear reduction boxes 926c and 926d, respectively, which in turn drive pinion gears 928c and 928d. Pinion gears 928c and 928d, in turn, drives sector spur gears 930c and 930d affixed to movable portions 306M and 307M, respectively, of thrust negation vanes 306 and 307, respectively. FIG. 9b is a view of hub 28 of FIG. 9a looking in the direction of section arrows b—b. FIG. 9b illustrates the relationship in the vertical plane of motor 924d to gearbox 926d and pinion gear 938d, and also illustrates that sector gear 930d "hangs" from the movable portion 307M of thrust negation vane 307.

Figure 9C:
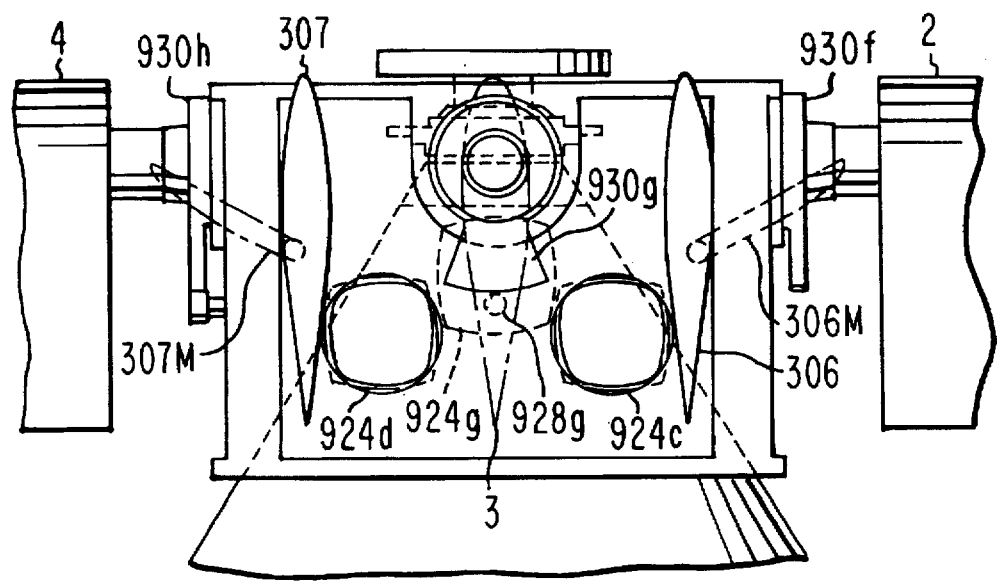
FIG. 9c illustrates a gear box drive a pinion gear which in turn drives a sector gear.

The position of each direction control vane 1, 2, 3, and 4 is also controlled by a stepping motor, a gear-reduction box, a pinion gear, and a sector spur gear. In FIG. 9a, direction control vane 1 is driven by a stepping motor 924e, which in turn drives a gear-reduction box 926e. Referring to FIG. 9b, gear reduction box 926e produces its relatively high-torque, low-speed output at pinion gear 928e, which drives a sector gear 930e affixed to vane 1. Stepping motor 924f, which drives direction control vane 2, can be seen in phantom in FIG. 9b, behind a support structure 988, which aids in supporting a bearing arrangement 992. Bearing arrangement 992 supports the upper end of shaft 990. Shaft 990 terminates in a flange 994, which allows connection to the four-bladed upper fan 26 (not visible in FIG. 9b). Stepping motor 924f drives a gear-reduction box 926f, which in turn drives direction control vane 2 by means of pinion gear and sector gear 930f, visible in FIG. 9c. Stepping motor 924g drives gear reduction box 926g, as is visible in FIG. 9a. Gear box 926g drives a pinion gear 928g, which in turn drives a sector gear 930g, as illustrated in FIG. 9c. Stepping motor 924h of FIG. 9a drives a gear box 926h, which drives a pinion gear 928h and sector gear 930h, as seen in FIG. 9c, to control the position of vane 4.

In accordance with an aspect of the invention, then, a vehicle 10 adapted for flight comprises a body 12 defining a forward/aft axis 9. The vehicle 10 includes at least one shrouded fan, such as 20, 31, 35a, and 35b, mounted on the body 12. The shrouded fan, such as 20, includes a circular shroud 22 defining a duct, and a fan, such as 26, centered for rotation in the duct. The shrouded fan 20, when powered, provides lift to the body 12 to aid in flight of the vehicle 10. The shrouded fan 20 further includes direction control vanes, such as vanes 1, 2, 3, and 4, for redirecting airflow through the duct in a manner which provides a net thrust in at least one of forward/aft and left/right directions. The shrouded fan further includes thrust negation vanes, such as 5, 6, 7, and 8, which are located within the duct, which thrust negation vanes reduce the lift provided by the shrouded fan 20. Each of the thrust negation vanes 5, 6, 7, and 8 associated with one of the ducts is elongated along an axis of elongation 309, and extends across at least a portion of the duct with the axis of elongation 309 of the thrust negation vanes parallel with the forward/aft axis (9) of the body (12). In a particular embodiment of the invention, at least one of the direction control vanes 1, 2, 3, or 4 comprises an elongated airfoil, such as airfoil 305, defining a quarter-chord axis, illustrated as 410 in FIG. 3c, and is arranged for rotation about that quarter-chord axis. In a particular embodiment of the invention, at least one of the lift negation vanes 5, 6, 7, or 8 comprises first and second portions which together, in a closed state, define an elongated airfoil which provides relatively small resistance to the flow of air through the duct, and which, in an open state, splits along a plane of symmetry thereof, such as parting line 518, so as to have a movable portion, such as 305M, of the airfoil 305, extending transversely relative to the flow 420 of air through the duct, to thereby produce turbulence which reduces the lift. In a particularly advantageous embodiment of the invention, the vehicle 10 tends to pitch down during forward motion due to the effects of the forward motion on the lift of the ducted fan or fans such as 20, 31, 35a, and 35b. In this embodiment, the vehicle 10 further includes a horizontally-disposed airfoil 44 affixed to the vehicle body 12. The horizontally-disposed airfoil 44 includes portions 44a, 44b which are rotatable synchronously to provide pitch control of the vehicle, and also includes a speed-sensor 710 for measuring forward airspeed, and a controller 712, 714, 718 coupled to the speed sensor 710 and to the horizontally-disposed airfoil, for controlling the rotatable portions 44a, 44b of the airfoil to provide a pitch-up control responsive to the forward airspeed, for tending to counteract the pitch-down of attitude. The controller may also include a pulse generator 820 for generating pulses in response to the commanded amount of rotation, and a stepping motor 824 coupled to the airfoil to move the airfoil in response to the pulses. In a preferred embodiment of the invention, the speed-sensitive attitude controller, in addition to tending to correcting pitch as a result of forward speed, also tends to correct roll which responds to forward speed.

Other embodiments of the invention will be apparent to those skilled in the art. For example, while an air-land vehicle with four ducted fans has been described, more or fewer ducted fans may be provided. Also, the vehicle may be for airborne use only, rather than dual-use. While totally movable rudder elements 40a and 40b have been described, conventional rudder elements may be used, in which only a trailing portion is movable. While the description of the operation of the thrust negation and direction control vanes has been made using the vanes of large upper fan 20 as examples, those skilled in the art will recognize that the corresponding vanes of the other ducted fans operate in the same manner.

What is claimed is:

1. A vehicle adapted for flight, said vehicle comprising:
   a body defining a forward/aft axis;
   at least one shrouded fan mounted on said body, said shrouded fan including a circular shroud defining a duct, and a fan centered for rotation in said duct, said shrouded fan, when powered, providing lift to said body to aid in flight of said vehicle, said shrouded fan further including direction control vanes for redirecting airflow through said duct in a manner which provides a net thrust in at least one of forward/aft and left/right directions, said shrouded fan further including thrust negation vanes located within said duct, which reduce said lift provided by said shrouded fan, each and every one of said thrust negation vanes associated with said duct being elongated along an axis of elongation, and extending, across at least a portion of said duct, with said axes of elongation of said thrust negation vanes parallel with said forward/aft axis of said body.

2. A vehicle according to claim 1, wherein at least one of said direction control vanes comprises an elongated airfoil defining a quarter-chord axis, and arranged for rotation about its quarter-chord axis.

3. A vehicle according to claim 1, wherein at least one of said lift negation vanes comprises a first portion and a movable second portion which are joined along a seam, in a closed state, to define an elongated airfoil which provides relatively small resistance to the flow of air through said duct, and which, in an open state, splits along said seam so as to have said movable portion of said airfoil extending, at least in part, transversely relative to said flow of air through said duct, to thereby produce turbulence which reduces said lift.

4. A vehicle according to claim 3, wherein said one of said lift negation vanes has said movable portion mounted on an axle, and includes torque spring means for providing a torque tending to counteract a torque exerted by aerodynamic forces acting about said axle.

5. A vehicle according to claim 1, wherein said one of said lift negation vanes has said portion extending transversely mounted on an axle, and said axle is moved under the control of a stepper motor acting through a gear reduction mechanism.

6. A vehicle according to claim 1, wherein said vehicle tends to pitch down during forward motion due to the effects of the forward motion on the lift of said ducted fan, said vehicle further comprising:
   a horizontally-disposed airfoil affixed to said vehicle, said horizontally-disposed airfoil including at least a portion which is rotatable to provide pitch control of said vehicle;
   speed-sensing means for measuring forward airspeed; and
   control means coupled to said speed-sensing means and to said horizontally-disposed airfoil, for controlling said portion of said airfoil to provide a pitch-up control responsive to said forward airspeed, for tending to counteract said pitch-down of attitude.

7. A vehicle according to claim 6, wherein said control means comprises;
   pulse generating means for generating pulses, each of which is representative of a commanded increment of rotation; and
   a stepping motor coupled to said portion of said horizontally-disposed airfoil for incrementing rotation of said portion of said horizontally-disposed airfoil in response to each of said pulses.

8. A vehicle according to claim 7, wherein said vehicle tends to roll in an amount related to the airspeed during forward flight, due to increased lift on advancing blades of said fan, and decreased lift on retreating blades of said fan, said vehicle further comprising:
   an airfoil arranged for roll control; and
   control means coupled to said airfoil for controlling said airfoil in response to said airspeed of said vehicle in a manner which tends to reduce said roll.

9. An air-land vehicle adapted for terrestrial vehicular use and for flight, said vehicle comprising:
   a body defining a forward/aft axis;
   at least one shrouded fan mounted on said body, said shrouded fan including a circular shroud defining a duct, and a fan centered for rotation in said duct, said shrouded fan, when powered, providing lift to said body when in flight, said shrouded fan further including direction control vanes for redirecting airflow through said duct in a manner which provides a net thrust in at least one of forward/aft and left/right directions, said shrouded fan further including thrust negation vanes located within said duct, which reduce said lift provided by said shrouded fan, nominally without net thrust in said forward, aft, left, and right directions, at least some of said direction control vanes comprising elongated airfoils arranged for rotation about their quarter-chord axes.

10. A vehicle according to claim 9, wherein at least one of said thrust negation vanes is elongated along an axis of elongation, and extends across at least a portion of said duct, with said axis of elongation parallel with said forward/aft axis of said body.

11. A vehicle according to claim 9, wherein at least one of said lift negation vanes comprises a fixed first portion and a movable second portion which together, in a closed state, define an elongated airfoil which provides relatively small resistance to the flow of air through said duct, and which, in an open state, splits along a plane of symmetry thereof, so as to have said movable portion of said airfoil extending nominally perpendicular to said flow of air through said duct.

* * * * *